July 12, 1932.  E. C. SASSER  1,866,777

COFFEEPOT

Filed June 9, 1930  2 Sheets-Sheet 1

Inventor:
Edward C. Sasser,
By Parker Cark
Atty.

July 12, 1932.    E. C. SASSER    1,866,777
COFFEEPOT
Filed June 9, 1930    2 Sheets-Sheet 2
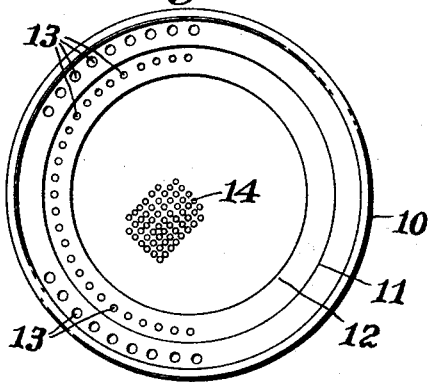
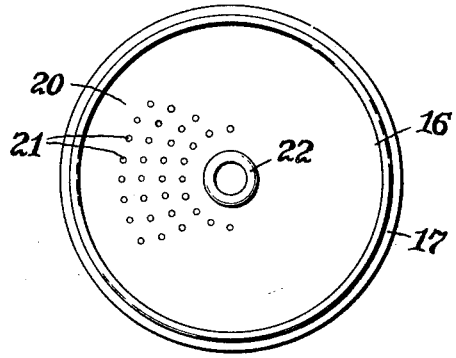
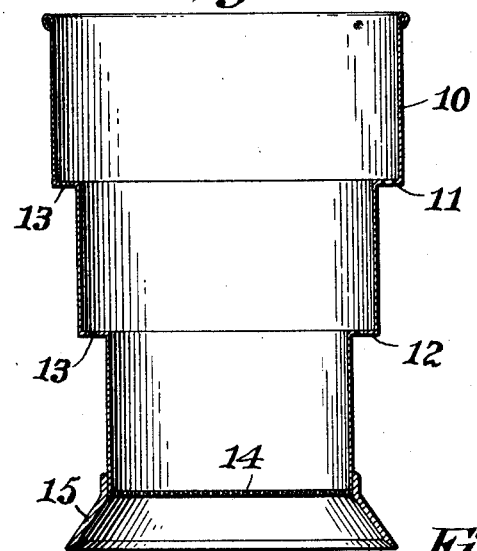
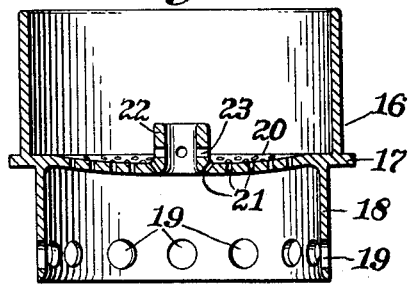
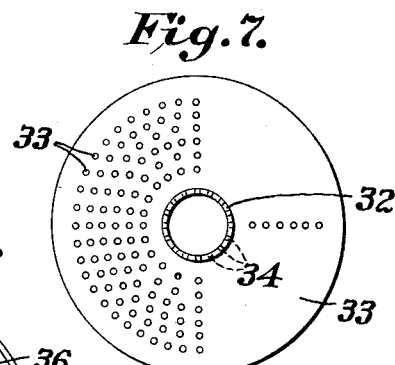
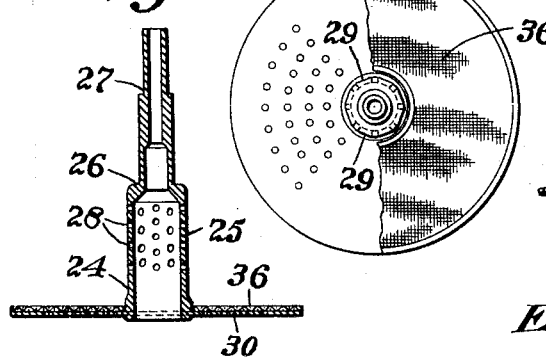
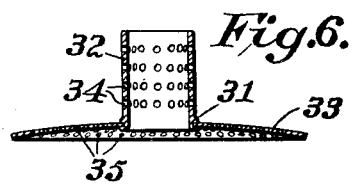
Inventor:
Edward C. Sasser,
By Parker Cook Atty.

Patented July 12, 1932

1,866,777

UNITED STATES PATENT OFFICE

EDWARD C. SASSER, OF CHEVY CHASE, MARYLAND

COFFEEPOT

Application filed June 9, 1930. Serial No. 460,056.

My invention relates to new and useful improvements in cooking utensils, and more particularly to a coffee pot.

One of the objects of the present invention is to provide a coffee pot wherein the same is so constructed that coffee may be made by either boiling or by percolating, or, if desired, drip coffee may be made.

Another object of the invention is to provide a coffee pot wherein the same is so constructed that even coffee that is ground exceedingly fine may be used with excellent results.

As is well known to those skilled in the art, it has heretofore not been practical to make percolated coffee when the same has been finely ground. In other words, coffee for boiling is ground to one fineness, coffee for percolating is ground to another fineness and coffee for drip is still more finely ground. With the present utensil, however, I can not only use the coffee that is ground for ordinary percolating, but I can even utilize the coffee that is finely ground and usually used only for making drip coffee.

Still another object of the invention is to provide a coffee pot wherein the coffee may be percolated without in any way agitating the cake, that is, the rise and fall of the water through the cake will be evenly and slowly distributed throughout the same without agitating or subjecting the particles to any violent motion.

Still another object of the invention is to provide a coffee pot wherein the coffee may be put into one of the several chambers, hereinafter to be mentioned, and wherein a superchamber container may be placed in the top of the pot, the openings or channels being such that the water may feed slowly down from the supercontainer through the mass or cake of coffee and, in fact, take some five or six minutes or whatever time is found most practical for making good coffee.

Still another object of the invention is to provide a coffee pot with a heat retaining element secured at its bottom which will serve two functions, that is, first when the coffee pot is used without the superchamber, the heat from the stove will heat the element at the bottom and this element will absorb the heat and dissipate it slowly, so that there will be a uniform circulation within the pot, even after the pot has been moved from off the stove. Second, the heat retaining element in the bottom is of advantage when the superchamber is used, as after hot water is poured within the superchamber and passes down through the pot, the heat retaining element will absorb some of the heat and tend to retain this heat within the coffee pot.

Still another object of the invention is to provide a coffee pot wherein not only may coffee be definitely made in several ways, but the pot may also be used for making tea by simply inverting one of the parts.

Still another object of the invention is to provide a coffee pot wherein not only fine or coarse ground coffee may be used but wherein proportionate parts of coarse ground and fine ground coffee might be used, so a dark or light blended coffee may be obtained, as the action of the water is such that it will not disturb the different layers of coffee that are put within the receiving chamber.

Still another object of the invention is to provide a coffee pot wherein the parts are so arranged that the volume of water which comes into contact with the coffee mass rises and falls slowly or, in other words, passes up and down through the mass to thus extract the oils but without liberating the acids and leaves the mass in a spongy condition, so that the water may reach and affect each and all of the separate particles of the coffee.

With these and other objects in view, the invention consists in certain new and novel arrangements and combinations of parts, as will be hereinafter more fully described and pointed out in the claims.

Referring now to the drawings showing a preferred embodiment of my invention,

Fig. 2 is a detail vertical section of the stepped cone member;

Fig. 3 is a top plan of the same;

Fig. 4 is a detail vertical section of the perforated cap chamber;

Fig. 5 is a plan of the same;

Fig. 6 is a detail vertical section of a perforated diaphragm;

Fig. 7 is a top plan of the same;

Fig. 8 is a detail vertical section of the filter and air escape member;

Fig. 9 is a top plan partly broken view of the same;

Figure 1:
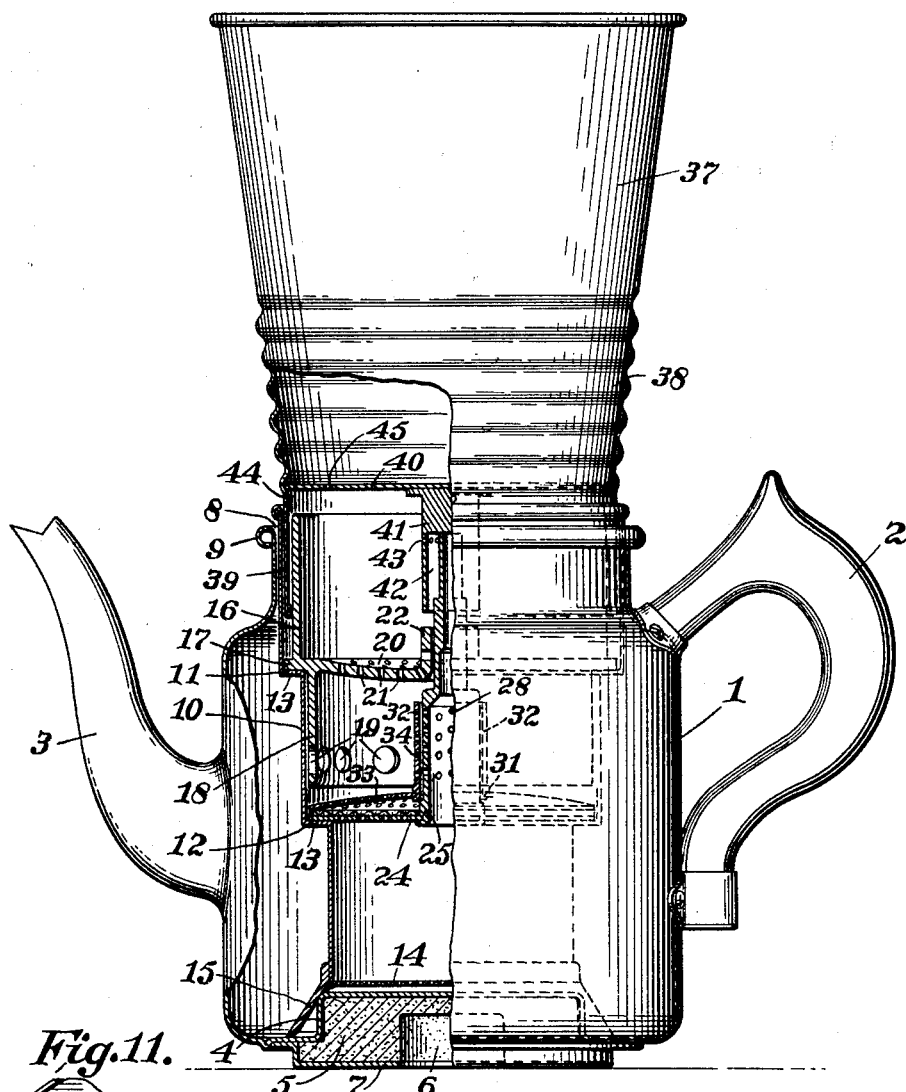
Fig. 1 is a side elevation, parts being in section and parts being broken away for the sake of clearness, and the superchamber in position.
Figure 11:
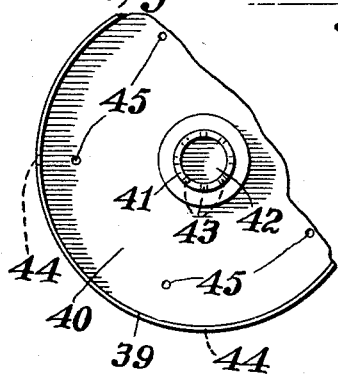
Fig. 11 is a fragmentary bottom plan view of the superchamber.

Referring now more particularly to the several views, there is shown in Fig. 1 a coffee pot 1 with the ordinary handle 2 and a spout 3, while at the bottom thereof is an impressed chamber 4 in which there may be conveniently fitted a piece of soap stone or other heat retaining element 5, which may have the central cut-out portion 6, if so desired. Over this soap stone may be welded or crimped a cap 7, as this stone is never to be removed. By forming this heat retaining element in the bottom, it prevents careless burning of the coffee pot, as well as performing other functions to be mentioned.

The pot 1 is open at its top, as at 8, and may be ringed, as at 9. Of course, I do not wish to be limited to the exact shape of the pot or to its capacity and it might be mentioned that the drawings are scaled to designate a coffee pot that will hold about six cups.

Fitting within the pot 1, I provide what I term a stepped cone member 10, which may be made of aluminum, glass or other suitable material, and in the present embodiment I have shown the member as having the several steps 11 and 12. It will be understood that rather than having these side walls vertical, the member might be tapered just so that the steps 11 and 12 are retained. It will be noticed that in these steps or overlapping portions, in each instance there are the small holes 13, which extend around the member, the purpose of which will be explained shortly. Near the bottom of the member is the screen 14, which extends over the element 5 when the parts are in position.

The lower edge of the member 10 is deflected outwardly, as at 15, and forms a base, and its diameter and circumference are such that they will just bridge the impression 4 in the bottom of the pot but not seal the same, which impression 4, it will be remembered, contains the heat retaining element 5. As may be seen in Fig. 1, when this cone member 10 is in position, the base 15 rests on the bottom of the pot, and although it contacts with the bottom of the pot nevertheless the water will pass underneath the lower edges of the base 15 and up through the screen 14, as will be described more in detail.

To fit within this cone member 10, I provide the top chamber cap member 16, which has the overlying edges 17 but these edges do not seal the little perforations 13, while extending downwardly is the skirt 18, in which there are the peripheral openings 19, providing air passages and for anchoring the mat or cake of coffee, so that when this cap is withdrawn, the mat or cake will tend to stay in a mass rather than drop out on the hands or floor.

Extending across this cap member is also the integral screen 20, which is perforated, as at 21, and it will also be noticed that even the central hub 22 has the perforations 23 therein, while the bottom 20 may be slightly dished, as shown in Fig. 4, if desired.

When this cap member is placed in position, it will appear as clearly shown in Fig. 1, that is, the overlying peripheral edge 17 will rest on the step 11 of the cone member 10.

Also fitting within the cone-stepped member 10 is the air filter and screen member 24, which consists of what might be termed a hollow stem 25, which is slightly decreased, as at 26, and again at its upper end, as at 27. This member is provided with the openings in its lower portion, as at 28, which are preferably irregularly disposed about the member, the purpose being that all of them will not register with a screen member, shortly to be mentioned.

As may be also noticed in Fig. 9, rather than having this lower portion 25 circular in cross section, the same is polygonal. In other words, there are a series of flat sides, as at 29, rather than circular, and the advantages of this will also be shortly described, when the details of description of making the coffee are outlined. At the bottom of the member 24 is the screen 30, and this screen will rest on the step 12 of the cone member to be supported thereby.

Also fitting over the stem of this filter member 24, there is positioned a perforated diaphragm 31, which has the central hollow hub 32 and the concave screen 33. The hub 32 is provided with a plurality of perforations 34 that extend around the hub, but these are also not in perfect alignment, as when this member is placed over the stem of the member 24 it is not desired to have all of the perforations 28 align with all of the perforations 34. Also, as may be seen in Figs. 8 and 9, resting on the bottom screen 30, I provide a very small mesh screen 36, so that when the member 31 is placed on the member 24, this small screen 36 will be located between the diaphragm 33 and the screen 30.

In Fig. 1, there is shown a superchamber 37 that may or may not be utilized, depending on how it is desired to make the coffee, and it will be understood that it may be made conical or of any desired shape. In its lower portion, I have provided a plurality of corrugations 38, so that any sediment or foreign matter that might get into this chamber will collect in the corrugations rather than pass down into the coffee pot.

It will be seen that this superchamber also has a skirt 39 that is adapted to loosely fit down within the upper portion of the cone member 10, and also adjacent the upper walls of the cap member 16. In the bottom plate 40 of this chamber 37 and centrally thereof is the central downwardly extending hub 41 with the small chamber 42 therein, so that when this superchamber is in position, the upper portion 27 of the stem member 24 will fit within this chamber 42 and support the superchamber 37 thereon.

Leading within the chamber 42 are the small perforations 43, while likewise within the skirt 39 of the superchamber 37 may be seen the little perforations 44, so that air may escape or circulate from the small chamber 42 through the perforations 43 and pass across the chamber of the cap member 16 and out through the holes 44 in the skirt of the superchamber. It will also be remembered that the superchamber fits loosely within the cone member 10, thus allowing a full circulation in the cap member 16.

Now to allow the water to flow from the superchamber 37 down into the pot, I provide about five small holes 45 in the bottom plate 40 but, of course, more or less could be provided, if desired.

Having thus described all of the parts of my improved coffee pot, I will now outline the manners in which the coffee may be made and the manner in which the circulation of both the air and the water takes place.

I will first outline the manner in which coffee may be percolated and without the superstructure.

*Percolated coffee*

Referring to Fig. 1 and considering that the superchamber 37 is removed, I then withdraw the cap 16 and place the coffee on top of the small screen 33, putting in the number of spoonsful desired, depending upon the number of cups of coffee to be made. After the coffee is placed on the screen, I then place the cap 16 in position over the coffee which may extend up to the bottom of the screen 20, depending upon the amount used. It will be seen that the skirt of the cap member 16 does not extend all the way down to the screen 30, which allows for the water to not only pass through the holes in the skirt but also lets the water pass out underneath the edge of the skirt. Then, water (not shown) will be poured into the pot, or the water might be placed in the pot before the coffee is provided.

The pot is then placed on the stove and as the water is heated, it being remembered that there is water within the cone-shaped member, as well as around its outsides, it will expand within the cone-shaped member and will pass up through the screens 30 and 36 and also through the central hub and the little perforations in both the hub and the member 31 and will also pass up through the perforations 21 in the screen 20 and into the cap chamber. As it rises, it will drive the air from without the coffee and without the chambers just mentioned, the air escaping, of course, from around the top of the pot. The water also passes through the coffee mat and through the holes 19 and the holes 13 in the steps and out towards the walls of the coffee pot, as the water will naturally be cooler around the walls of the coffee pot than it will be centrally of the pot.

As the water is rising centrally of the cone member, it will be understood that it will also draw the water from around the periphery or base 15 of the cone member toward the center and thus there is a circulation from around the walls of the pot to the center of the pot and up through the cone member and its associated parts. Also, I have noticed that sometimes, the circulation of water seems to pass up through the mat and then slowly down through the same. In other words, there seems to be a breathing in the pulsation at times as well as the continued circulation.

By providing the little holes 13 in the several steps of the cone member, it will be seen that the water will circulate from the center out through these holes, even though they have screens or lips resting on the steps. Thus, it will be seen that there is a constant circulation of the expanding water up through the mass or cake of coffee, the air being driven off and the water slowly passing through the cake.

It will also be appreciated that by having this heat retaining element centrally of the pot, there is a more uniform heat obtained which, in turn, results in a slow and constant circulation of the water through the pot. The temperature should be kept below the boiling point, so that it is not the boiling action of the water that passes through the mat or cake but the even and constant circulation up through the center and down the sides.

I have found that coffee made in this way is of excellent taste, clear and free from the acids, as only the caffeine and oils are liberated.

By providing a screen 14 at the bottom of the cone chamber 10, it will prevent any coffee from passing through the screen that might drop downwardly and, at the same time, it will catch any coffee grounds that should flow into the water from the side of the pot down under the base 15 and up against the screen 14. If, however, there are any coffee grounds liberated by the water that should get through the screen 14, they will tend to collect either back on the other little screens 33 or the fine mesh screen 36 or will, if they pass these screens, embed themselves with the rest of the mass of coffee.

Due to the fact that the mass or cake is not agitated or violently agitated, as in the ordinary manner of making coffee, it will be seen that I can also blend the coffee, as desired. In other words, I can put different layers of coffee on the screen 33, that is, say a layer of light coffee, a layer of dark coffee and then a layer of light coffee, and I have found, after making as many as one thousand cups of coffee, that the circulation is such that the mass will not be agitated but will remain in the layers or strata as originally placed.

Furthermore, I have found that I can use the cheaper grade of coffee, that is, the extra fine ground or even a low grade of coffee, as the same is not violently agitated and just the oils will be liberated rather than the ill-tasting acids.

It might be mentioned that although I have not shown an ordinary top on the coffee pot in the drawings, it will be understood that when the superchamber is not used, any form of top or cover may be used for the pot.

*As made with the superchamber*

Supposing now it is desired to make the coffee of the same taste or quality or blend every day, this may easily be accomplished by using the superchamber illustrated in Fig. 1. The coffee will be placed in the same position, that is, on the top of the small plate 33, and after the superchamber is placed in position, it will be filled with boiling water. In this instance, the water will slowly pass through the small holes 45 and on down through the several screens and holes and rise slowly within the pot 1, it, of course, driving the air from the pot and from the coffee out around the screens, through the screens and up through the perforations 21 in the cap 20 and out around the skirt of the superchamber and out through the holes 44, which latter are just above the top edge of the cone member 10.

The water will run rather fast at first from the superchamber until it rises and floods the mat and on up possibly to the top of the tube 28.

The size of the superchamber is such that it cannot hold more water than the pot, so that there is no danger of the water spilling over the top of the pot.

Now it will be understood that as the water rises in the lower portion of the pot, up to just above the step 12 of the cone and, of course, past the lower screens, the air will also pass out through the holes 32 of the hub 31 and also through the holes 28 in the member 24 and up centrally through the member 24 and thus out into the small chamber 42 and its holes 43 and there circulate in the cap chamber 16, thence out through the holes 44 in the skirt.

It will also pass around the edge or periphery of the lower screens, through the holes 13 of the steps of the cone member, and out at the top of the pot, that is, between the side wall of the cone member and the wall of the pot, and also up beyond the skirt of the superchamber and out through the holes 44.

It will also be remembered that the member 24 is polygonal near its base, as at 29, rather than circular, so that air may also pass up between these flat sides and the inner circumference of the hub 32 of the diaphragm 31, and also up through the hub 22 of the cap member 16.

It will also be understood that not only does air circulate through these various openings, but the water will follow although, of course, the water will not escape through the openings 44 or around the inner walls of the top of the pot.

By providing the heat retaining element at the bottom of the pot and beneath the cone member, the water within the cone will, of course, be more evenly heated and there will be a constant circulation of the expanding water in the pot and through the cake or mat of coffee.

With the arrangement above shown, after the water is poured into the superchamber, it will take five or six minutes to empty itself and to flow down and around the pot and when the superchamber is empty the coffee is ready for drinking. The pot is kept on one side of the stove or is entirely removed from the same, as it is the hot water which is poured into the superchamber that furnishes the heat for making the coffee.

It might be mentioned that although I have not shown a cloth within the bottom of the cone member 10, it will be understood that if it is desired to catch every minute ground of coffee that might otherwise escape through the screens, a very thin wad of cloth might be stuck down within the cone member and rest on the screen 14 and this, in turn, will catch any floating particles. However, I have found that with the several screens, as shown, it is not necessary to use a strainer cloth.

Of course, if it is desired to simply boil the coffee in the regular manner, it would only be necessary to place the coffee on the screen 14 within the cone member 10 and add the water. The coffee would then be boiled in the ordinary manner, but I have found that when coffee is boiled, the acids are liberated and it is not nearly as desirable.

Drip coffee or tea

Figure 10:
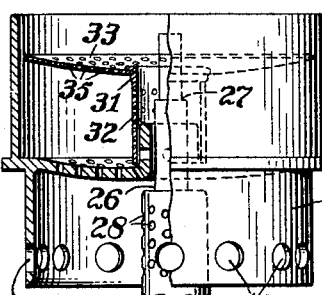
Fig. 10 is a side elevation, partly in section of a modified arrangement for making drip coffee or tea.

Supposing it is desired to make the well known drip coffee or to make tea, I find that it is simply necessary to place the coffee or tea in the cap chamber 16. The small diaphragm 31 is then inverted from the position shown in Fig. 1 or Fig. 6 and placed over the coffee or tea, as clearly shown in Fig. 10, the hub in this instance fitting more loosely about the stem of the member 24. The superchamber 37 is then placed in position and the desired amount of boiling water placed within the superchamber. Now, the water will pass down through the holes 45 in the bottom of the superchamber and onto the inverted member 31 and strike the perforated concave disk 33. The water thus liberated, on striking this disk, will partly pass through the openings 35 and will partly flow toward the center and down through the hollow hub 32. As this water descends to drive out the air in the pot and in the coffee or tea, the air will be liberated through the various perforations in the member 24 and through the perforations in the hub 32 and up around the same, and will also pass up through the stem of the hollow member 24 and out through the little perforations 44 in the skirt of the superchamber.

The water, as it fills up the pot, will not pass up to the lower level of the coffee or tea within this cap chamber 16, so that there is no constant circulation here but, on the other hand, the coffee or tea is only subjected to the water as it passes down from the superchamber to the pot.

Should it be desired, however, to make the coffee stronger or to make the tea stronger, after the water has passed from the superchamber through the mat into the pot, it is only necessary to pour the water from the pot back into the superchamber, place the superchamber in position and let the water slowly again drip down through the coffee mat or the tea. The coffee or tea will not fill or back up about the stem 27 of the member 24, because the air will circulate and escape through this central portion, and its action will keep the particles of tea or coffee from about this stem and the walls of the hub.

From the foregoing, it will be seen that I have provided a coffee pot wherein the coffee may be made in several ways and wherein the action of the water is constant and uniform, whereby the mat or cake of coffee will not be violently disrupted or agitated. This is an advantage, as by a slow uniform circulation of water, all of the grounds are subjected to the action of the water and the desirable oils will be liberated rather than the undesirable oils and acids.

Furthermore, it is possible with the arrangement above shown to not only use the higher grade coffees and the more coarsely ground coffees, but I can also use the cheaper grades or extra fine ground coffee without in any way affecting the taste of the coffee.

Again, by the foregoing arrangement, the coffee may be blended to suit the taste or by using a superchamber, coffee of the same quality and taste may be made day after day without change and by simply pouring the water in the superchamber.

Finally, it will be seen that the coffee pot is one that may be easily cleaned, as there are no long stems or tubes that extend from the bottom to the top of the coffee pot, as is the case with the percolating coffee pots that are in use today, and it is well known that any small accumulation of acid in the tube will contaminate an entire pot of coffee.

I have found in actual practice that by providing the cone member and the cap chamber, as shown, and that by providing the air space between the cone member and the walls of the pot and by providing a heat retaining element at the bottom, the pot will retain its heat several times longer than the ordinary coffee pots in use.

Having thus described my invention, what I claim as new and desire to secure by Letters Patent is:

1. A coffee pot having a heat-retaining element at the bottom thereof, a stepped member fitting above said element, and the steps of the stepped member provided with openings whereby a constant circulation for the liquid is provided up through the stepped member and around and down the sides of the pot.

2. A coffee pot having a stepped member fitting therein, the stepped member provided with holes at its outer periphery to thereby permit a circulation of the coffee up through the stepped member and out of the sides of the same and down and around the walls of the coffee pot.

3. A coffee pot having a heat retaining element centrally of its bottom, a member having different diameters fitting loosely over the heat-retaining member, the coffee grounds supported within said member, the said member having openings at different points throughout its heights whereby the expanding liquid within the pot will flow upwardly at the center of the pot and member and downwardly at the sides of the pot to thereby provide a constant circulation.

4. A coffee pot having a heat-retaining element in its bottom, a stepped member within the coffee pot and having a strainer therein, a cap chamber fitting within the stepped member, the cap member having a perforated bottom, said stepped member having perforations in its steps whereby there will be a constant circulation from the sides of the coffee pot to the bottom of the stepped member and up therethrough.

5. A coffee pot having a heat-retaining element in its bottom, a chamber of varying diameters within the pot and directly over the heat-retaining element, said chamber having openings in its various circumferences, a perforated cap member fitting within said chamber, and the cap member provided with a skirt whereby there will be a circulation of expanding liquid up through the chamber and out around the skirt and out through the various diameters of the chamber to the inner side walls of the coffee pot.

6. A coffee pot comprising in part a stepped member provided with a plurality of perforations in the overhanging walls of the various steps.

7. A coffee pot comprising a heat-retaining element in its bottom, a stepped chamber fitting over the heat-retaining element, a cap chamber resting on a step of the said stepped member, the said steps and the bottom of the cap chamber provided with perforations, and a screen member resting on the lower step of the cap member adapted to hold the coffee whereby a constant circulation may be had up through the coffee and down the side walls of the coffee pot.

8. A coffee pot comprising a heat-retaining element, an internally removable stepped chamber, resting on the bottom of the pot, removable means for holding the coffee fitting within said chamber, a cap member also in said chamber over said coffee, the chamber, coffee holding means and the cap provided with perforations whereby there will be a constant circulation of liquid upwardly from the bottom of the chamber, through the coffee and outwardly to the sides of the coffee pot and downwardly again to the bottom of the said chamber.

9. A coffee pot having a heat-retaining element centrally of its bottom, a removable chamber fitting over the bottom and extending to the upper edge of the coffee pot, a screen member provided with a hollow stem and perforations within said stem, a diaphragm with a hollow hub, and said diaphragm and hub perforated, and said hub fitting over said aforementioned stem, a cap member fitting into said chamber and over said screen and diaphragm, said cap member provided with perforations in its bottom whereby there will be a constant circulation through the parts aforementioned in said chamber and through said chamber outwardly to the sides of the coffee pot.

10. A coffee pot having a heat-retaining element at its bottom, a stepped chamber over said heat-retaining element and provided with openings in said steps, a screen member with a relatively short stem resting on one of said steps, a perforated diaphragm loosely mounted over said stem, and the said stem and the diaphragm provided with passageways for the circulation of air and liquid, a cap member resting on one of said steps, said cap member loosely engaging the hub of the screen member whereby the air may escape from within the pot and the circulation of liquid will be centrally upwardly of the pot and downwardly of the sides of the pot.

11. A coffee pot having a heat-retaining element in its bottom, a chamber centrally of the pot, means within the chamber for supporting the coffee, a super chamber provided with minute openings in its bottom and provided with a depending skirt and openings about the periphery of the skirt just below the bottom whereby when liquid is poured within the superchamber it will feed down slowly through the chamber for supporting the coffee and will circulate back and forth through the coffee until the superchamber is empty and will then circulate from the center towards the side of the pot.

12. A coffee pot, a removable open-ended chamber fitting within said coffee pot, a cap member within said chamber, a superchamber fitting over said cap member and perforations in the bottom of the superchamber, screens within the chamber, and the chamber, cap and screens so arranged as to permit the escape of air from within the coffee pot to thus let the liquid flow from the superchamber into the coffee pot and to also allow a slow circulation of the expanding liquid from the chamber to the side walls of the coffee pot and down under said chamber and upwardly therethrough.

13. A coffee pot comprising a heat-retaining element in its bottom, an open-ended chamber over said element and extending to the upper edge of the coffee pot, a cap member in the top of said chamber, an invertible diaphragm fitting in said cap chamber, the coffee adapted to be placed in said cap member and above the liquid level of the pot, said cap member and said chamber provided with perforations, a superchamber above said cap whereby water may drip on said coffee and circulate from the center of the pot and outwardly and downwardly of the sides of the pot.

In testimony whereof I affix my signature.
EDWARD C. SASSER.